United States Patent
Herbenar

[15] 3,679,248

[45] July 25, 1972

[54] BALL JOINT

[72] Inventor: Edward J. Herbenar, Detroit, Mich.

[73] Assignee: TRW, Inc., Cleveland, Ohio

[22] Filed: Aug. 5, 1971

[21] Appl. No.: 169,425

[52] U.S. Cl. ............................................. 287/87, 29/149.5
[51] Int. Cl. ........................................................ F16c 11/06
[58] Field of Search ............................... 287/87, 90 R, 90 C; 29/149.5 B, 441 R, 511

[56] References Cited

UNITED STATES PATENTS

| | | | |
|---|---|---|---|
| 1,883,882 | 10/1932 | Davis | 287/90 R |
| 2,880,025 | 3/1959 | Herbenar et al. | 287/90 R X |
| 3,147,537 | 9/1964 | Fadow | 287/90 R UX |
| 3,389,927 | 6/1968 | Herbenar | 287/87 |

*Primary Examiner*—Andrew V. Kundrat
*Attorney*—Carlton Hill et al.

[57] ABSTRACT

Preloaded ball and socket joints for automotive wheel suspensions and steering linkages of the type having the ball member enveloped by a plastic bearing compressed between the ball member and a housing to maintain a fixed tilting center for the ball in the housing while expanding to take up wear between the parts together with the added improvement of an initially locally deformed retainer spring regaining its undeformed condition as wear develops to increase the wear take-up capacity of the joint without increasing the turning torque or extruding the plastic bearing material.

7 Claims, 6 Drawing Figures

PATENTED JUL 25 1972  3,679,248
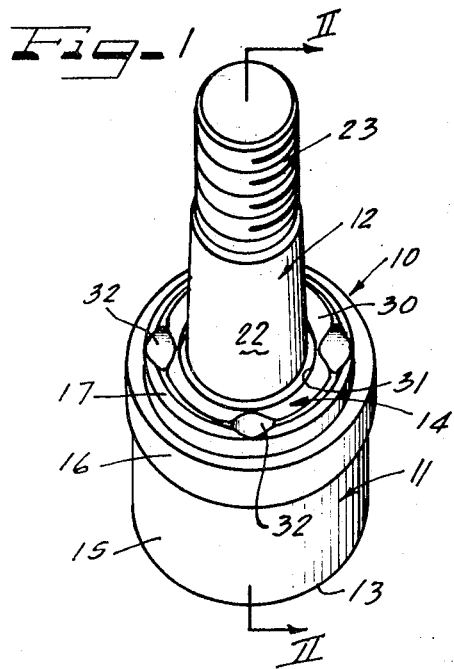
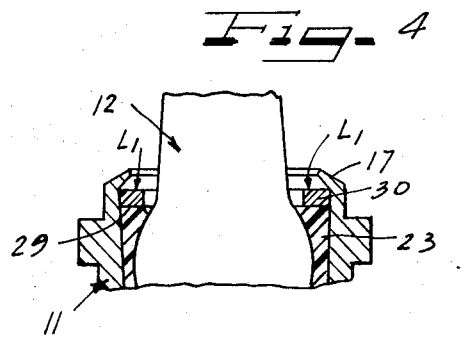
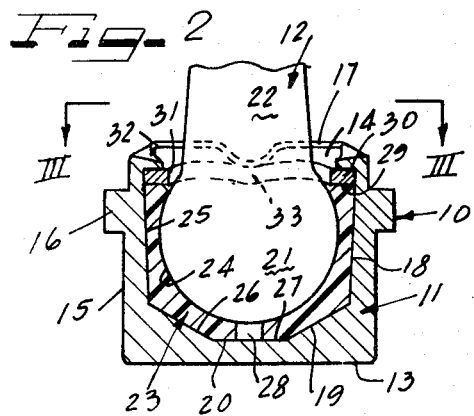
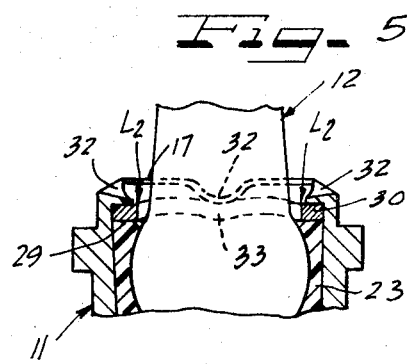
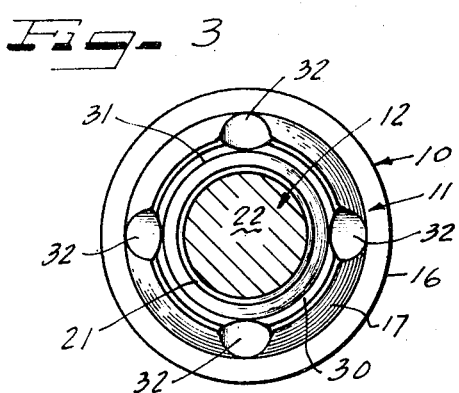
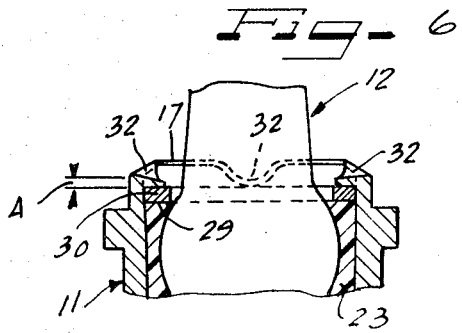
INVENTOR.
EDWARD J. HERBENAR

BALL JOINT

BACKGROUND OF THE INVENTION

1. Field of the Invention

This invention relates to preloaded plastic bearing ball and socket joints for automotive steering linkages and wheel suspensions having enhanced wear take-up capacity imparted by an initially deformed spring member reclaiming its undeformed shape to take up wear without increasing the turning torque of the ball member. Specifically, the invention deals with a preloaded plastic bearing ball and socket joint construction having a locally deformed retainer spring ring which reclaims its undeformed flat condition as wear develops to maintain the preload of the bearing on the ball without adding friction to the bearing surfaces.

2. Description of the Prior Art

In my U.S. Pat. Nos. 3,249,375 dated May 3, 1966, No. 3,389,927 dated June 25, 1968 and No. 3,413,023 dated Nov. 26, 1968, there are described and claimed various forms of ball and socket joints having preloaded plastic bearings maintaining constant turning torque and fixed tilting centers for the ball studs. The wear take-up capacity of these joints is enhanced by increasing the preload on the plastic bearings, but such increases bring about increases in the amount of torque required to tilt or rotate the ball stud relative to the bearing.

SUMMARY OF THE INVENTION

The present invention now provides additional wear take-up capacity for preloaded plastic bearing ball and socket joints such as those disclosed and claimed in my aforesaid U.S. Pats. by positioning a spring washer between one end of the plastic bearing and the housing loading the bearing and then locally deforming portions of the housing and ring. The deformed ring tends to reclaim its original shape, but since it is held by the local deformed portions of the housing it can only do so when wear develops between the joint components, and in this manner a continuing preload is maintained on the plastic bearing without adding to the initial preload. Thus, the invention provides preloaded plastic ball and socket joints having enhanced wear take-up capacity and useful life while maintaining an initially imposed turning torque and fixed tilting center for the ball studs.

The invention will hereinafter be described as embodied in a socalled reverse socket pivot joint of the type illustrated in my aforesaid U.S. Pat. 3,389,927, but it should be understood that the principles of this invention are generally applicable to preloaded plastic bearing pivot joints.

It is then an object of this invention to increase the wear take-up capacity and useful life of preloaded plastic bearing pivot joints such as disclosed in my U.S. Pat. No. 3,249,375, No. 3,389,927 and No. 3,413,023.

Another object of this invention is to increase the wear take-up capacity of preloaded plastic bearing pivot joints by staking localized depressions in a joint housing and an underlying spring ring loading the plastic bearing.

A further object of this invention is to provide a retainer ring in the housing of a plastic bearing equipped ball joint and to locally deform the housing and spring ring to maintain a continuing load on the plastic bearing when wear develops between the components through the hysteresis action of the spring ring in attempting to regain its original undeformed shape.

A specific object of the invention is to provide a reverse socket pivot type joint with a preformed one-piece bearing member of deformable plastic material stretched around the ball end of a ball stud and pressed in the socket housing with a spring retainer ring overlying the bearing and the open end of the socket spun over the ring to preload the bearing and then having areas of its spun over rim locally staked to form bulges in the ring pressing into the bearing so that as the bearing wears the ring will assume its initial flat condition and the staked portions of the housing will hold the ring at the level of the depressed bulges, thereby continuing the preload on the bearing.

Another object of the invention is to enhance the wear take-up capacity of preloaded plastic bearing pivot joints without increasing the resistance to tilting or turning of the joint parts.

Other and further objects of this invention will become apparent to those skilled in this art from the annexed sheet of drawings which by way of a preferred embodiment only, illustrates one example of the invention.

BRIEF DESCRIPTION OF THE PREFERRED EMBODIMENT

FIG. 1 is a perspective view of a reverse socket preloaded plastic bearing ball joint of this invention;

FIG. 2 is a cross-sectional view taken along the line II—II of FIG. 1;

FIG. 3 is a transverse cross-sectional view along the line III—III of FIG. 2;

FIG. 4 is a diagrammatic fragmentary vertical sectional view illustrating an initial step in the preloading of the joint of this invention;

FIG. 5 is a view similar to FIG. 4 but illustrating the local staking operation;

FIG. 6 is a view similar to FIG. 5 but illustrating the wear take-up capacity of the deformed spring washer.

AS SHOWN ON THE DRAWING

The joint 10 of FIGS. 1 and 2 include a cup-shaped metal housing 11 and a metal ball stud 12. The housing 11 has a closed bottom 13, an open top 14, a cylindrical side wall 15 with an outturned circular flange 16 around the upper end thereof and a spun-in rim 17 in the open end 14. A slightly tapered bore 18 extends inwardly into the housing from the open end 14 thereof to an acute or flat tapered portion 19 converging to a flat central bottom wall 20. The cylindrical exterior wall 15 of the housing in use is pressed into the eye end of a tie rod, wheel suspension part or the like (not shown).

The ball stud 12 has a full ball end 21 in the housing 11 with a tapered shank portion 22 extending freely through the open end 14 of the housing and converging to an externally threaded cylindrical end 23. In use, the tapered portion 22 of the shank fits in the tapered recess of a link member or suspension part and a nut is threaded on the end 23 to wedge lock the tapered portion 22 into the receiving tapered bore.

A plastic bearing 23 embraces the ball end 21 of the stud and is press fitted in the housing 11 seating on the bottom wall 20 thereof and terminating inwardly from the open end 14 thereof. This plastic bearing 23 is a molded block or plug of low friction, rigid but somewhat compressible, elastic memory plastic material. Suitable plastics are high density polyolefines, particularly high density polyethylene materials such as sold by Phillips Chemical Company under the trade name "Marlex"; by the DuPont Company under the trade name "Alathon"; and by Celanese Plastics Company under the trade name "Fortiflex". These plastic materials have sufficient elasticity to accommodate a change in their preformed molded shape, but they do have elastic memory for reclaiming the preformed shape, thereby providing wear take-up capacity during use. The materials are relatively rigid although somewhat compressible so that they will maintain fixed tilting centers for the ball studs.

The molded bearing block or plug 23 has a substantially full ball socket interior wall 23 smaller than the ball head 21 so that the plastic must be stretched over the ball and enlarged from the free state ball socket size by the ball. A tapered external wall 25 of larger diameter than the tapered bearing wall 18 of the housing is provided on the bearing 23 so that the bearing will be compressed as it is forced into the socket. The bearing also has a tapered wall 26 conforming with the tapered bottom 19 of the housing and a flat bottom 27 conforming with the flat bottom 20 of the housing. A small hole 28 extends through this bottom 27 of the bearing.

The top of the bearing has a flat end face or rim 29 at a level inwardly from the open end of the housing when the bearing is bottomed in the housing. This rim 29 has substantial radial depth.

A metal ring or washer 30 fits freely in the open end of the housing 11 and has an aperture 31 substantially larger than the large end of the tapered shank portion 22 so as to be spaced therefrom and accommodate free tilting of the stud in the ring. The ring 30 rests on the flat end face or rim 29 of the bearing 23.

The ring 30 is pressed into the housing to exert a predetermined axial load on the bearing 23 regardless of the depth of penetration of the ring into the housing to obtain this loading of the plastic. Then, the open end of the housing is spun over the periphery of the ring as shown at 17 to lock the ring in the housing. In this manner the desired preload on the plastic 23 is obtained, deforming it axially from a free state condition and creating stresses within the body thereof which will maintain a desired torque on the ball end of the stud. Then, as wear develops the stressed bearing 23 will tend to regain its unstressed larger shape, taking up wear and maintaining the joint components in good loaded bearing contact.

To enhance the wear take-up capacity of the joint, the ring 30 is made of high carbon steel and heat treated to give it spring-like qualities. In addition, the spun over rim portion 17 of the housing is locally staked at several peripherally spaced areas to form depressions 32. Four such depressions 32 are illustrated, but it should be understood that three or any desired number can be used. The staking is accomplished by a tool applied with sufficient force to locally deform the retaining ring at areas 33 underlying the staked portions 32 and to provide a desired amount of additional preload on the bearing 23.

Thus, as illustrated in FIG. 4, the flat washer or retainer ring 30 is initially forced into the housing 11 against the bearing 23 therein with a load $L_1$ designated by the arrows. Then the housing rim is rolled over the periphery of the washer as illustrated at 17 to maintain this load $L_1$ on the bearing 23.

Next, as illustrated in FIG. 5, the rolled over or spun-in portion 17 is locally staked to form depressions such as 32. These depressions cause waves or bulges 33 to be formed in the ring 31 under the staked portions 32, and these waved or bulged portions will press into the top face or rim end 29 of the bearing 23. An increased load $L_2$ is thus imparted to the plastic bearing 23 by the deformed stake portions 32. These stake portions are permanent and are effective to locally deform the normally flat spring washer 30 giving it a wave-like configuration and causing it to press into the rim end 29 of the plastic at the bulged or depressed areas.

As illustrated in FIG. 6, as wear of the bearing 23 occurs after long usage of the joint the spring washer or ring 30 will reclaim its original flat condition of FIG. 4, but since the staked portions 32 remain, the washer is held at the level of the staked portions and in reclaiming its flattened condition it can only move downwardly against the bearing 23, causing the bearing to maintain its tight fit around the ball end 21 of the stud. The force $L_2$ exerted by the staked portions 32 on the washer or retainer ring 30 will be maintained and distributed through the flattened ring to the bearing. A wear take-up capacity illustrated by the distance A between the arrows in FIG. 6 is thus provided.

From the above descriptions, it should be understood that the invention provides, through localized deformation of a spring retainer, added wear take-up capacity and useful life for preloaded plastic bearing pivot joints.

I claim as my invention:

1. A preloaded plastic bearing pivot joint which comprises a housing, a stud having an end in the housing, a preloaded plastic bearing in the housing surrounding the end of the stud, said bearing being deformed from an initial free state condition and having elastic memory to reclaim said condition, a spring ring pressed in the housing in its unstressed free state between said bearing and housing and initially preloading the bearing on said stud end while in said free state, means on the housing deforming load portions of said pressed ring into the bearing, and said deformed ring being effective to reclaim its free state condition for adding wear take-up capacity to the preloaded bearing for maintaining the preload on said stud end.

2. In a preloaded plastic bearing ball and socket joint, the improvement of a spring washer in the socket acting on the plastic bearing, staked depressions in the socket deforming the washer into a wave configuration, and said deformed washer being effective to reclaim its free state condition for increasing the wear take-up capacity of the joint.

3. A ball and socket joint which comprises a stud having a ball end, a rigid but compressible plastic bearing enveloping said ball end in tiltable and rotatable relation therewith, a rigid housing enveloping said bearing, means on said housing preloading said bearing on said ball end and in said housing, a spring washer in said housing between said means and said bearing, and locally deformed portions in said means forming a wave in said washer and holding the washer at a depressed level in the housing as the washer returns to its initial shape upon wear between said ball end and said bearing.

4. The joint of claim 1 wherein the means deforming the ring are staked depressions in a rim of the housing overlying the ring.

5. The joint of claim 2 wherein the staked depressions are circumferentially spaced around a rim of the socket overlying the washer.

6. The joint of claim 3 wherein the washer underlies an annular lip of the housing containing the deformed portions in circumferentially spaced relation.

7. The joint of claim 3 wherein the housing is a cup, the bearing is a plug terminating inwardly from the open end of the cup, the washer overlies the bearing in the open end of the cup, the open end of the cup has an inturned lip pressed against the washer, and the depressed portions are staked depressions in the lip.

* * * * *